United States Patent
Rettig et al.

(10) Patent No.: US 7,757,642 B2
(45) Date of Patent: Jul. 20, 2010

(54) TUBE SHEET PRESSURE RETAINING PLUG FOR WATER TUBE CONDENSERS, POWER BOILERS, AND HEAT EXCHANGERS

(76) Inventors: Mark W. Rettig, 148 Soth Cove Ct., Bessemer, AL (US) 35020; Michael D. Sullivan, 313 Conde Ave., Dauphin Island, AL (US) 36528

( * ) Notice: Subject to any disclaimer, the term of this patent is extended or adjusted under 35 U.S.C. 154(b) by 0 days.

(21) Appl. No.: 11/516,574

(22) Filed: Sep. 7, 2006

(65) Prior Publication Data
US 2008/0092358 A1 Apr. 24, 2008

(51) Int. Cl.
*F16L 55/11* (2006.01)

(52) U.S. Cl. ............... 122/511; 138/89; 138/97

(58) Field of Classification Search ........... 122/511, 122/DIG. 13, DIG. 14; 138/89, 90, 97, 94; 4/295
See application file for complete search history.

(56) References Cited

U.S. PATENT DOCUMENTS

| 789,620 | A | * | 5/1905 | Mason | 138/91 |
| 1,702,241 | A | * | 2/1929 | Buckley | 122/245 |
| 2,276,606 | A | * | 3/1942 | Baerenklau | 220/284 |
| 4,425,943 | A | * | 1/1984 | Martin | 138/89 |
| 4,823,846 | A | * | 4/1989 | Everett et al. | 138/89 |
| 5,456,290 | A | * | 10/1995 | Haberman et al. | 138/89 |
| 6,073,327 | A | * | 6/2000 | Inoue et al. | 29/235 |
| 6,758,244 | B2 | * | 7/2004 | Workman et al. | 138/89 |
| 6,981,524 | B2 | * | 1/2006 | Jorgensen | 138/89 |
| 2006/0277756 | A1 | * | 12/2006 | Ivery | 29/890.031 |

* cited by examiner

Primary Examiner—Gregory A Wilson
(74) Attorney, Agent, or Firm—John J. Yim (57) ABSTRACT

The present invention concerns a boiler tube plug, which is used to plug holes left in drum walls after removal of failed boiler tubes in industrial power boilers, condensers, or heat exchangers. The present invention concerns a new and innovative boiler tube sheet plug for power boilers addressing the needs in the art. The boiler tube plug of the present invention may be used in evaporators, condensers, heat exchangers and other power boilers as appropriate as known in the art.

12 Claims, 7 Drawing Sheets

TUBE SHEET PRESSURE RETAINING PLUG FOR WATER TUBE CONDENSERS, POWER BOILERS, AND HEAT EXCHANGERS

FIELD OF INVENTION

The present invention concerns a tube sheet retaining plug for water tube condensers, power boilers, and heat exchangers. Primary or secondary furnace super heaters and re-heaters are important steam powered generators, used today throughout the world as industrial power generators. Industrial power boilers may be over one hundred feet in width with boiler tubes that may be over forty feet in length. Such boilers are used as power generators in numerous industrial applications, such as in paper mills and nuclear plants.

Energy transfer occurs through numerous metal boiler tubes, which connect large industrial drums. When failure occurs in such boiler tubes, they must be removed and plugged. The present invention concerns a new and innovative plug for holes remaining after the failed boiler tubes have been removed.

BACKGROUND

Industrial power boilers generally comprise cylindrical drums that hold medium to be heated, i.e., water and steam. The interiors of such drums are connected by numerous metal boiler tubes or pipes. Water from a drum may pass through such boiler tubes while being heated. As the water is heated and converted into steam, the steam may collect in another drum.

Similar to a smoke stack, heated gas enters through one end and exits through the other of a power boiler, with the boiler tubes being positioned in the cross stream of the heat to maximize heat transfer. The heat source may be fire from coal or gas or other fuel source as known in the art. The boiler tubes are positioned apart in relation to each other to allow gas to flow around the metal tube while maximizing heat transfer. The boiler tubes are positioned to allow maximal surface area exposure to the heat. The various components, steam drums, mud drums, and boiler tubes can all be customized for size, material, and other specification as needed.

Figure 1:
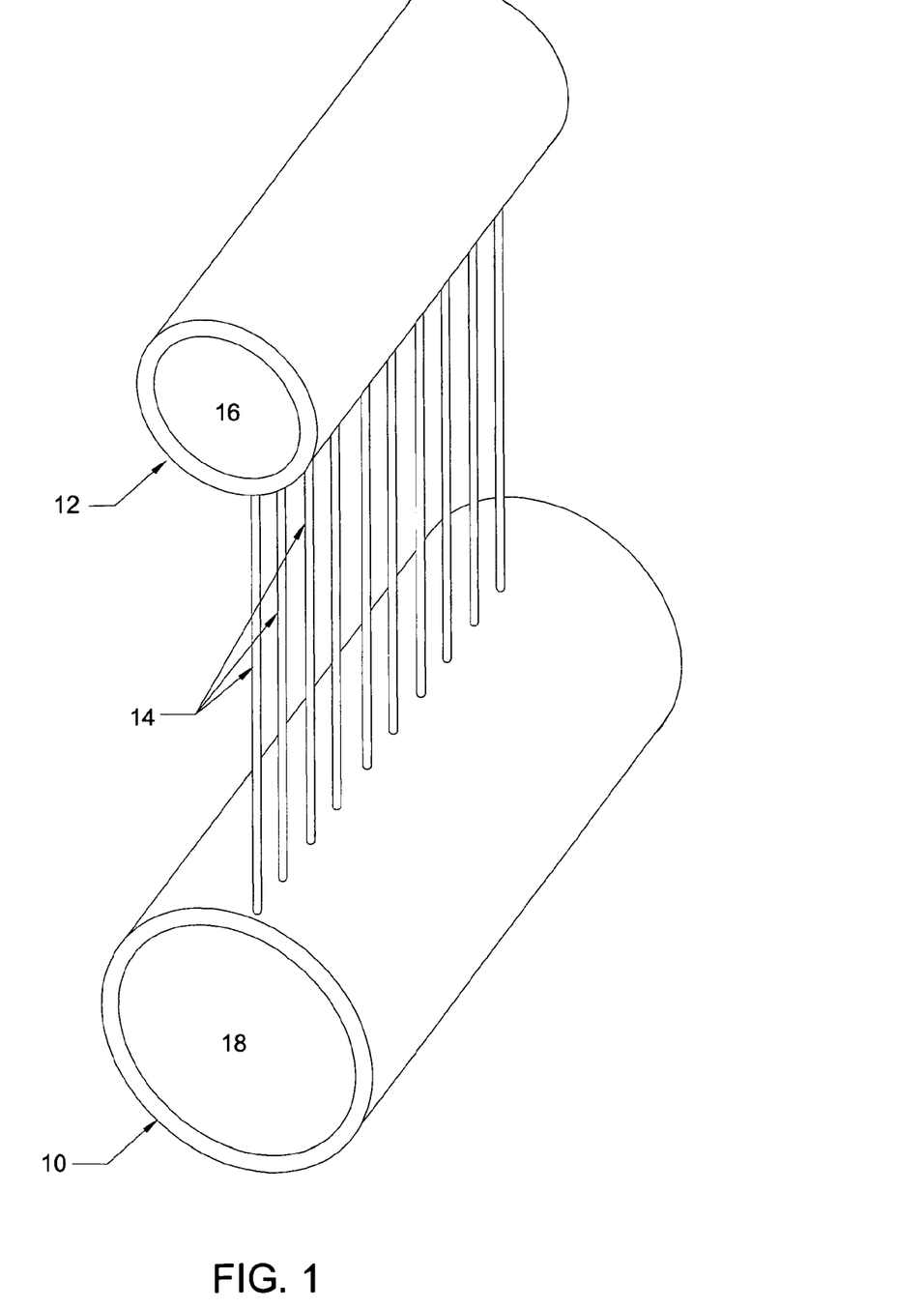
FIG. 1 illustrates a mud drum and a steam drum connected by numerous boiler tubes.

FIG. 1 shows an example of a layout of two drums, a mud drum 10 and a steam drum 12, which are connected by numerous boiler tubes 14. As shown in FIG. 1, the mud drum 10 and the steam drum 12 may be positioned vertically to each other, or with one positioned on top of another in relation to each other. In other embodiments, the mud drum 10 may be positioned horizontally in relation to each other or otherwise customized as desired or needed. In FIG. 1, water may be held in the interior portion 18 of the mud drum, and as water is heated, heated steam passes through the boiler tubes 14 to collect at the interior portion 16 of the steam drum 12. Water, which may start at ambient room temperature of 90 degrees, may quickly become superheated to 900 degrees or more. Thus, with the use of water for example, the boiler becomes a powerful steam generator.

Such hollow cylinder drums may be extremely large and have wall thicknesses of an inch or more. The boiler tubes may be 10 to 60 feet in length or more and may be customized according to need. In some embodiments, the boiler tubes may number 2000 or more, for example.

Need in the Art

The boiler tubes 14, as shown in FIG. 1, often fail. A crack or a fissure in such boiler tubes 14 will cause water and steam to leak out. To address boiler tube failures, the entire power boiler must be shut down. Once the boiler has been shut down, it must be allowed to cool before inspectors can determine the point of failure. Once failure points are identified, the failed boiler tubes must be removed and plugged.

Thus, boiler tube failures involve expensive costs and loss of income for power boiler operators. For example, some boilers may cost its operator up to $25,000/hr in lost revenues. To properly and safely address the failures, a power boiler may take an entire day to shut down, another day to properly cool, another day to fix the failure, and another day to bring the entire boiler back up to operating conditions.

When a boiler tube fails, the entire boiler tube is generally removed or cut out, if possible. By removing the boiler tubes, a hole is left in the drums. In the embodiment shown in FIG. 1, when a single boiler tube is removed, a hole would be left in the mud drum 10 and the steam drum 12. Both of these holes will need to be plugged, one at the steam drum 12 and the other at the mud drum 10 to prevent water loss.

Figure 2:
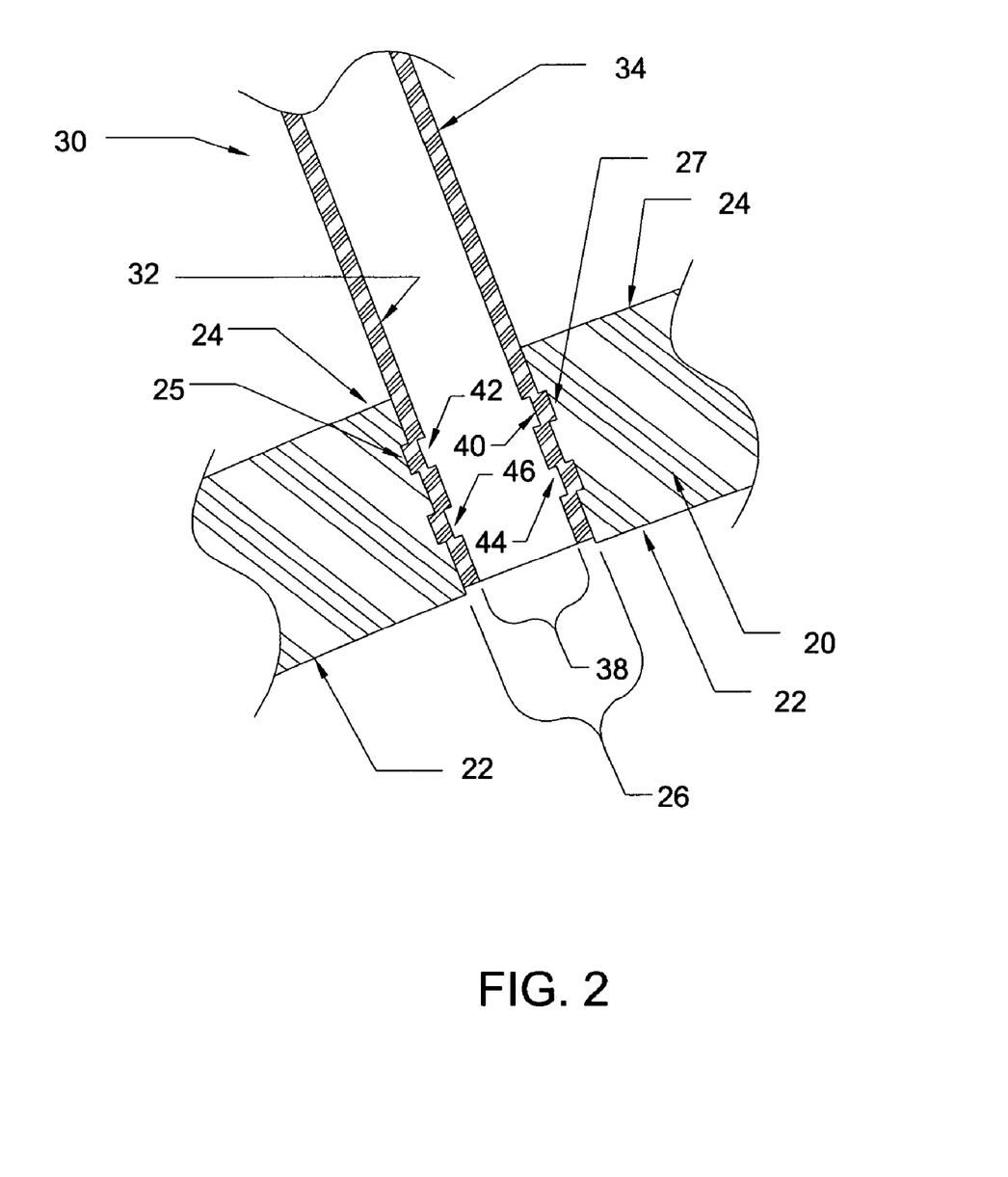
FIG. 2 shows a cross-sectional view of a drum shell with a boiler tube in place.

FIG. 2 shows a cross-sectional view of a boiler tube 30 in position in a drum shell opening 26 of a drum shell 20. The drum shell 20 comprises a water-side surface 22 of the drum shell 20 and a fire-side surface 24 of the drum shell 20. The water-side surface 22 of the drum shell 20 faces the interior of the drum, thus in contact with water or steam contained therein. The boiler tube 30 is hollow and has a boiler-tube opening 38, which connects the interior of said drum 20 with the interior of another drum (not shown). The boiler tube 30 also comprises an inner surface 32 and an outer surface 34.

In the embodiment shown in FIG. 2, the boiler tube 30 has already been expanded within said opening 26 of the drum shell 20. An expander (not shown) may be inserted from the interior of the drum through the boiler tube opening 38 to expand the plug into the opening 26 in which it is inserted. Expanded portions 40, 42, 44 and 46 of boiler tube 30 are shown schematically in FIG. 2. For example, if the expander is about 0.25 inches wide, it may start at one portion of the boiler tube 30 by being in contact with the inner surface 32 of the boiler tube 30. As the expander expands, it pushes against the inner surface 32, causing the boiler tube wall to expand out. In FIG. 2, expanded portions 40, 42, 44 and 46 are shown schematically as grooves that are spaced apart from each other. In practice, the expanded portions are preferably continuous, thereby expanding the circumference of the boiler tube 30 outwardly in a continuous manner. Serrations or grooves 25 and 27 would have generally been machined into the wall of the opening 26 before the boiler tube 30 would have been expanded. The serrations or grooves 25 and 27 are also shown schematically and are shown to note a friction fit to ensure against leaks or slips.

Figure 3:
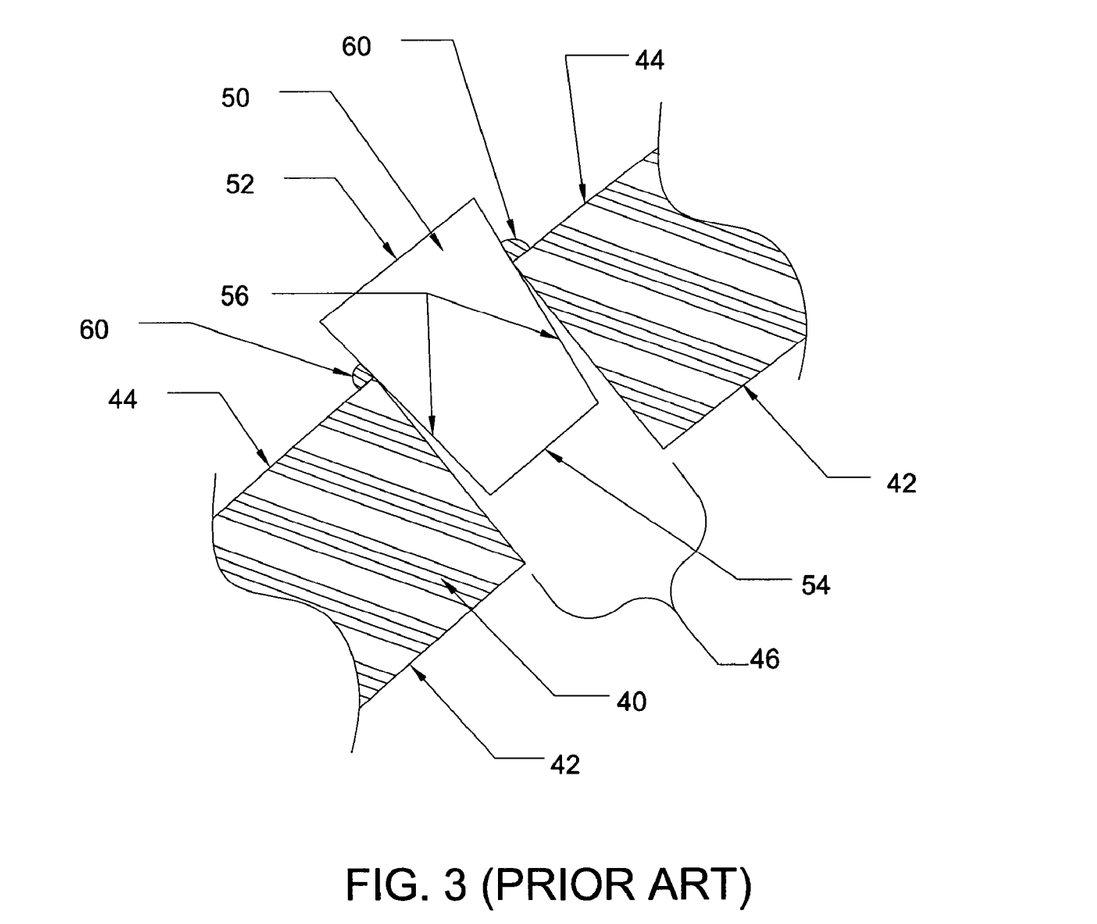
FIG. 3 shows a cross-sectional view of a drum shell with a failed boiler tube (not pictured) removed and replaced with a prior-art tapered plug.
Figure 4:
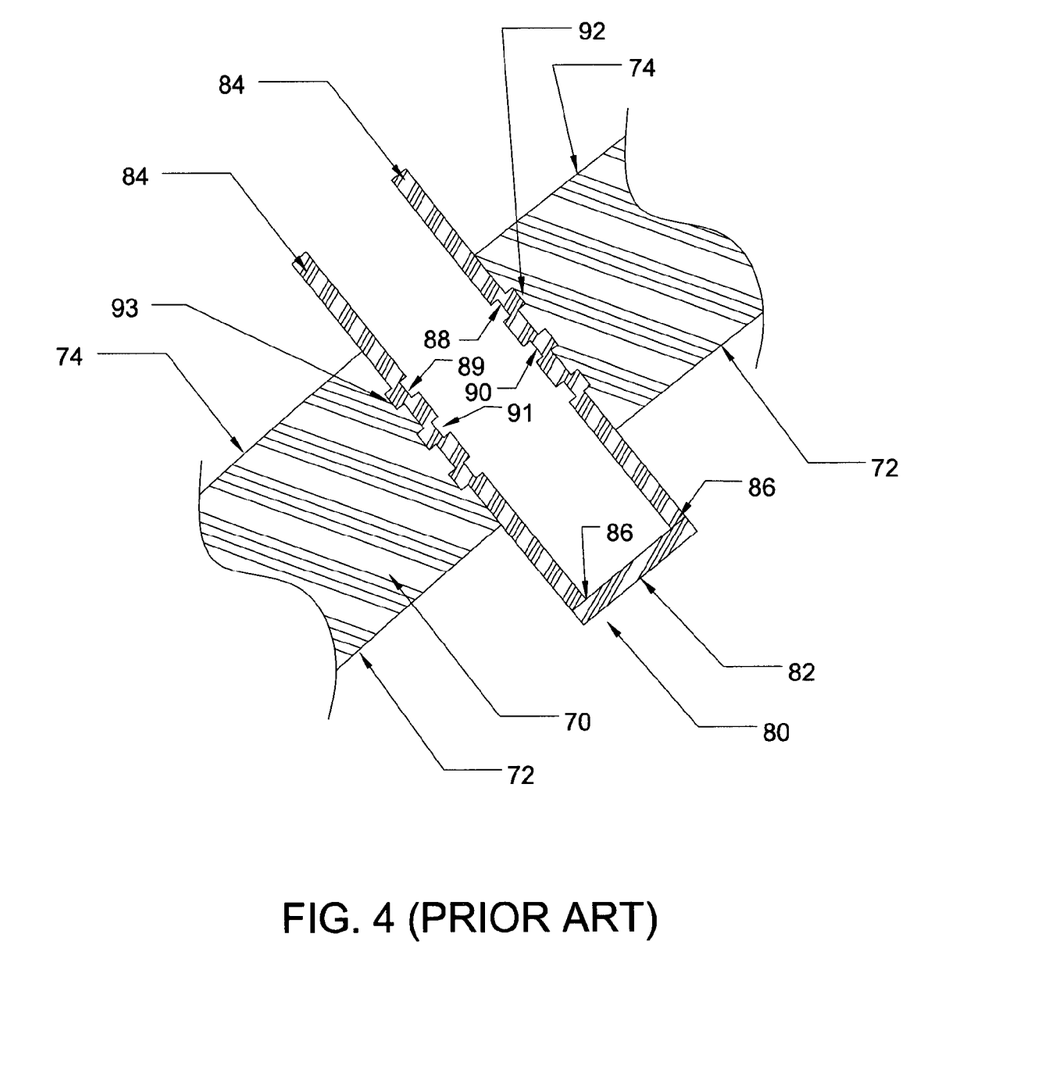
FIG. 4 shows a cross-sectional view of a prior-art plug used to plug a hole left by a removed boiler tube.

FIGS. 3 and 4 show cross-sectional areas of prior art plugs. In FIG. 3, the drum shell opening 46 is the hole left in the drum shell 40 after a boiler tube (not shown) has been removed. The drum shell 40 comprises a water-side surface 44, which is exposed to the interior of the drum, and a fire-side surface 42, which is exposed to the heated gas flow. The tapered plug 50 is inserted from the interior of the drum shell, the water-side surface 44 outwardly into the opening 46 toward the fire-side surface 42. The tapered plug 50 has a curved outer cylindrical, tapered wall 56, a first flat surface 52 and a second flat surface 54. The first flat surface 52 has a larger circumference than the second flat surface 54, with the circumference tapering gradually down toward the second flat surface 54. After the tapered plug 50 is inserted into said drum shell opening 46, it is generally hammered in and welded at the contact point between the water-side surface 44 of the drum shell 40 and the curved outer wall 56 of the tapered plug 50. The welding 60 must be made around the entire circumference of the contact points. The welding 60 is field welded, all the way around the contact points. Such welds must be completed by a certified welder and inspected or tested by a certified boiler inspector or NDE examiner.

A mechanical friction fit is created as the tapered plug 50 is hammered in. But the contact points may not be exactly uniform as desired. For example, certain points may have more secure contact as opposed to other points. Also, the welding 60 is time consuming and expensive, requiring certified personnel and compliance with strict safety certification requirements. Furthermore, the pressure of heated steam and water from within the interior of the drum shell 40 pushes out toward the fire side through the drum shell opening 46. The outward force further causes the prior art tapered plug 50 to often fail in time. The differences in expansion/contraction characteristics of the plug in comparison to the drum shell may also cause cracks and fissures over time.

FIG. 4 shows another prior-art tube plug 81, which consists of a cap 82 and plug tube wall 84. The plug tube wall 84 forms the walls of the tube plug 81, and the cap 82 forms a closed lid of the tube plug 81. The cap 82 of the prior art tube plug 81 is welded onto the plug tube wall 84 around the entire circumference at contact points 86. The welding process is time consuming and expensive, and requires manufacture according to strict safety requirements. Furthermore, these weld points are potential points of failure, requiring additional repair. Similar to FIG. 2, an expander (not shown) may be inserted into the interior wall of the plug tube wall 84 and be expanded. A schematic showing of the expanded grooves 88, 89, 90 and 91 are shown with serrations rings shows as 92 and 93 for example. As pressure from the steam and water pushes out from the side of the water side surface 72 or interior of the drum shell 70 to the fire side, the pressure pushes on the tube plug 80, ultimately causing further failure, requiring additional stoppage and repairs at the welds. Thus, there is a need in the art for and improved plug that better resists failure and that does not need to be welded and tested, thereby decreasing costs and labor and decreasing chances of further failure.

Description

The present invention generally concerns tube plugs to be inserted into holes left in drum walls of industrial power boilers after removal of failed boiler tubes. The present invention concerns a new and innovative tube sheet retaining plug for power boilers. The retainer tube plug of the present invention may be used in evaporators, condensers, heat exchangers and other power boilers as appropriate as known in the art.

Figure 5:
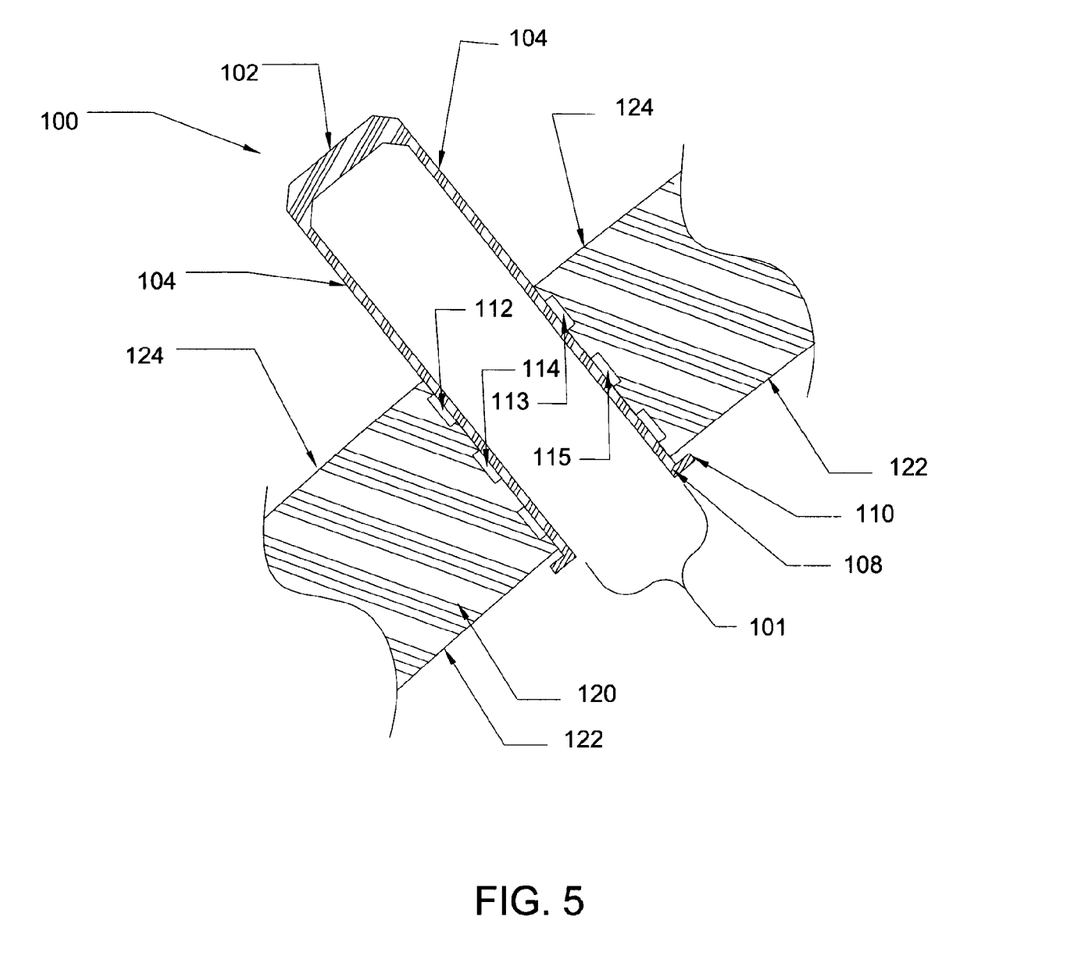
FIG. 5 shows a cross-sectional view of a retaining tube plug of the present invention inserted into a hole left by a removed boiler tube.
Figure 5A:
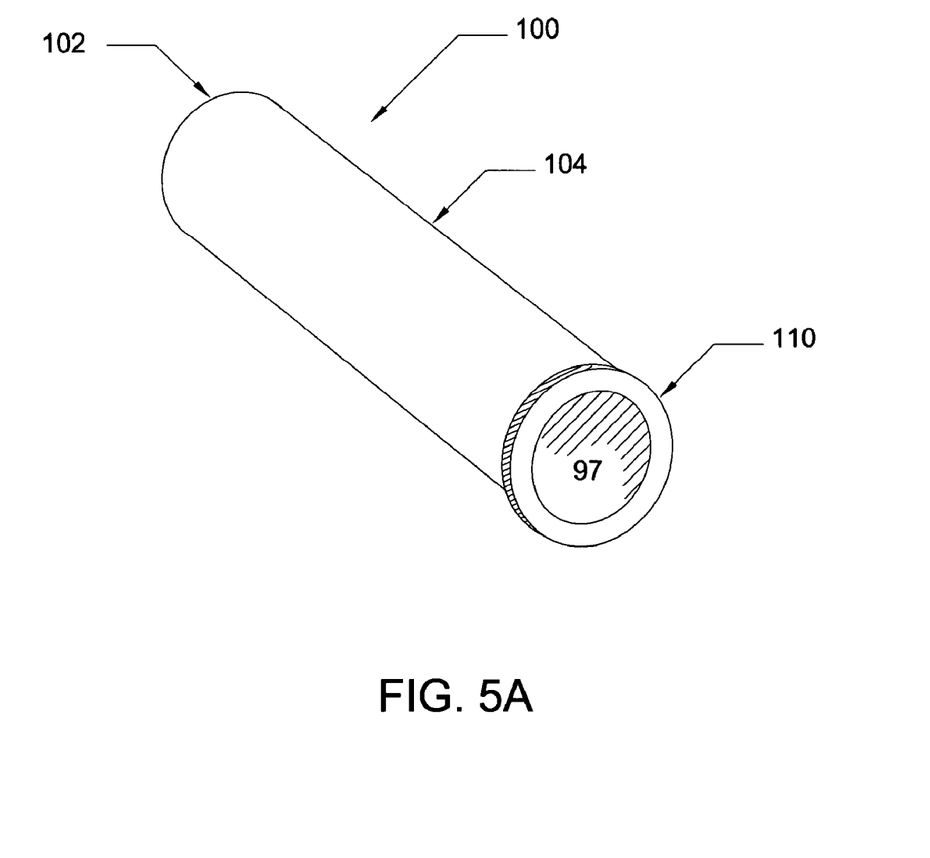
FIG. 5A shows a perspective view of a retaining tube plug of the present invention.

A perspective view of the pressure retaining tube plug 100 of the present invention is shown in FIG. 5A. The retaining plug 100 is made by machining from a solid piece of metal. It is a one-piece construction without any welded parts. For example, a section of SA-675-6R55 round stock may be machined to the required dimensions and bored, leaving enough material in the bottom to withstand the pressure and temperature requirements of the boiler.

The retaining plug 100 comprises a lip portion 110, the wall portion 104 and the closed end/cap portion 102. The wall portion 104 has a tapered tubular shape as shown in FIG. 5A. There is a lip 110 at the open end of the plug 97, which leads into the interior of the plug 100. Unlike prior art tube plugs, the end/cap portion 102 is not welded to the wall portion 104 since the entire retaining tube plug 100 is machined from a single piece of metal. Also as discussed, the closed end/cap portion 102 may preferably be thicker than the thickness of the wall portion 104 as may be dictated by pressure calculations for the specific boiler requirements.

As seen in FIG. 5, which shows a cross-sectional view of the retaining tube plug 100 inserted into the hole left by a removed boiler tube, the retaining tube plug 100 comprises a closed end/cap portion 102, wall portion 104 and a lip portion 110. As discussed, unlike prior-art plugs, the lip portion 110 is not welded to the wall portion 104. It is instead made from a solid "round-stock" and machined into the described shape. In another embodiment, the retaining plug 100 may also be forged or stamped or made as otherwise known in the art as a solid single piece construction.

Although FIG. 5 shows a space between the lip portion 110 and the water-side surface 122 of the drum shell 120, preferably, the lip portion 110 and the water-side surface 122 of the drum shell 120 are in direct contact with each other. As water or steam pressure from within the interior of the drum pushes out, it enters through the opening 101 of the pressure retaining tube plug 100 of the present invention. Because the lip portion 110 is abutting the drum shell wall 120, it acts as an additional safeguard against plug failure. The primary function of the lip, however, is to prevent the plug from being pushed into the hole too far.

Referring still to FIG. 5, serration rings 112, 113, 114 and 115 are preferably part of the existing drum, preferably machined into the original wall of the hole, and can be noticed in the interior of the hole once the old boiler tube is removed. The hole may have continuous serrations that allow for a better friction fit and they may typically be across the entire surface of the hole. Although FIG. 5 shows the serration rings schematically for artistic purposes, the serration is preferably continuous and closer together to form a more tightly fit serration pattern. The serration rings may be shaped as desired and may vary depending on the serration equipment used during the fabrication of the original drum as known in the art.

The retaining tube plug 100 of the present invention is cylindrical or tube shaped with one end being solid as to say a cap. A lengthwise cross sectional view is shown in FIG. 5. The outer circumference of the wall portion 104 of the tube plug 100 is just smaller than the hole in the drum shell 120 after removal of a failed boiler tube. For example, the diameter to the outer circumference of the wall portion 104 may be $1/10,000^{th}$ of an inch smaller than diameter of the hole left after removal of a failed boiler tube. Once the new plug is inserted into the existing hole, the plug will be expanded to make a compression fit between the exterior of the plug wall portion 104 and the surface of the hole of the drum shell 120.

The serrations help to make the fit a "friction fit" to prevent leaks or slipping of the tube within the hole.

The lip portion 110 extends outward at the end of the tube plug 100 and forms a lip. The resulting circular lip will have a diameter larger than the hole left by the removed boiler tube. The opposite end/cap portion 102 is completely enclosed. Thus, the retaining tube plug 100 of the present invention is inserted from within the interior of the drum shell 120 in FIG. 5 toward the outside of the drum. The lip portion 110 prevents the plug from sliding out of the hole until it is expanded in place.

The retaining tube plug 100 of the present invention shall be made from ASME approved material as known in the art. The thickness of the lip portion 110, the wall portion 104 and the closed end portion 102 may vary as known in the art. In one embodiment, the wall portion 104 may have similar or same thickness as the drum shell 120. In other embodiment, thicknesses may be configured as desired.

As discussed, once a boiler tube failure occurs, the entire power boiler must be shut down and allowed to cool. After identifying the failed boiler tube, it is preferably removed in its entirety from both the steam drum and the mud drum. The hole remaining in the drum shells are cleaned. As discussed, the wall of the hole may also be "honed" or cleaned back to the machined surface to recognize or expose the serrated surface and recondition the hole. Once the hole is measured, the size of the hole is verified to match the available plug size, and the retaining tube plug of the present invention is inserted into the hole.

The retaining tube plug 100 is inserted into the hole from within the interior of the drum shell. The retaining tube plug 100 is inserted with the closed end portion 102 first. As the tube wall portion 104 passes through the hole in the drum shell 120, the lip portion 110 will come in contact with the water-side surface 122 of the drum shell 120 preventing the new plug from passing through the hole and falling into the boiler.

Figure 6:
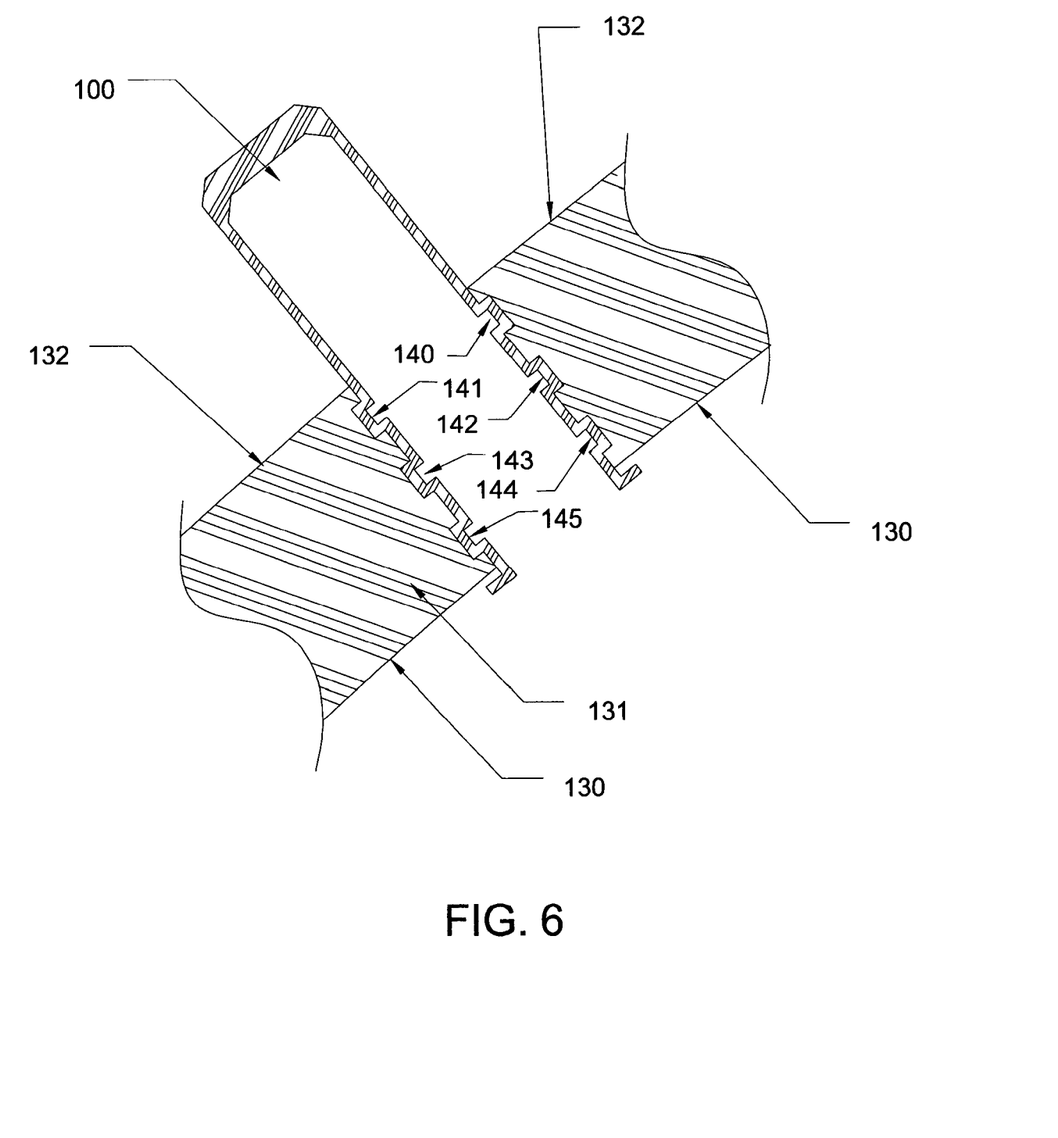
FIG. 6 shows a cross-sectional view of a retaining tube plug of the present invention inserted into a hole left by a removed boiler tube and expanded using an expander.

Once the retaining tube plug 100 of the present invention is in place, it is expanded using an expander. FIG. 6 shows a cross-sectional view of the retaining tube plug 100 after it has been expanded within the hole left by the removed boiler tube. As known in the art, an expander is inserted into the plug through the opening of the tube from the interior (or near the water-side surface 130) of the drum shell 120.

Various expanders are known in the art, and any appropriate expander may be used. Using an example of an expander that expands an area of about 0.25 inches at a time, an expander will gradually spin about its axis, expanding outwardly around the interior of the wall of the retaining tube plug 100. The resultant plug walls are reduced in thickness by a few thousandths of an inch as the wall of the plug is compressed during the expansion of the plug against the interior wall of the hole forming a "compression" fit.

FIG. 6 shows the schematic serrations in the wall of the hole left by the removed plug. As the expander (not shown) works, it will expand the wall of the retaining tube plug 100 outwardly. FIG. 6 shows a schematic view of various serration grooves in the wall of the hole and shows schematically how an expanded retaining tube plug will form a seal with the serration. As discussed, however, the serration patterns, expanding patterns and the type of expander may vary, depending on need. A decrease in the thickness of the wall portion of the retaining tube plug will occur upon expansion, for example at about 10-12% in thickness as compared to before expansion. After expansion, the expander is brought back to original size and pulled out of the plug. After hydrostatic testing, the unit is returned to service.

As the expander works, the surface of the hole left by the removed boiler tube and the outer surface of the retaining tube plug will be pressed against one another, forming a tight seal, or "compression fit", between the expanded wall of the plug and the hole. This seal is a mechanical seal, which withstands the pressures of the operation of the power boiler and the pressures exerted by water and steam from within the drum shell. As water pressure is applied from within the drum shell, the lip portion of the retaining tube plug 100 will also prevent the tube plug 100 from slipping further out of the hole. Furthermore, the mechanical seal formed by the expander will also keep the retaining tube plug in place.

The retaining tube plug of the present invention is advantageous in that it can be made quickly and be easily customized for each specific boiler. Using a conventional machining process, a solid piece of metal can be machined cost effectively to produce a desired retaining tube plug with specific sizes and dimensions. Because boiler tubes are often custom made with differing specifications, pre-purchased and shelved plugs specific to a specific boiler will allow for great savings when necessary emergency repairs are required.

The retaining tube plug of the present invention is advantageous in that it cuts down the time required to fix boiler tube failures, resulting in increased economic savings. Furthermore, because there are no welded parts, time consuming and costly expenses associated with welding and necessary inspections are save. Furthermore, installation process is easier and quicker. Furthermore, the retaining tube plugs can be custom sized easily and economically supplied and stored on site for quick and ready repairs without having to hire specially certified welders and inspectors, for example. Finally, the super fit and seal, as well as the lip portion's mechanical resistance to being pushed out by hydrostatic pressure, allow for a secure and improved plug.

We claim:

1. A retaining tube plug for insertion into a hole, resulting from removal of a failed boiler tube, in a drum wall of a power boiler comprising:
   a tube-shaped body portion, wherein the circumference of the cross sectional area of the tube-shaped body portion is constant along the length of the body portion;
   a closed-end portion at one end of said tube-shaped body portion,
      wherein said tube plug is closed at said closed-end portion, and
      wherein said closed-end portion is continuous with said tube-shaped body portion;
   a lip portion at the other end of said tube-shaped body portion,
      wherein said lip portion is continuous with said tube-shaped body portion,
      wherein said lip portion comprises an opening, which is continuous with the interior of said tube-shaped body portion, and
      wherein said lip portion extends radially out from said tube-shaped body portion;
   wherein said tube-shaped body portion, said closed-end portion and said lip portion are made from a single piece of metal;
   wherein said retaining tube plug is inserted into the hole, resulting from removal of the failed boiler tube, in the drum wall of the power boiler,
   wherein said retaining tube plug is inserted into said hole from a side interior of said drum wall with the closed-end portion inserted first until said lip portion is in contact with the drum wall;

wherein the lip portion of the retaining tube plug is rigid and does not collapse when pressure is applied to the tube plug;

wherein said retaining tube plug is expanded to form a mechanical seal with the surface of said hole.

2. The retaining tube plug according to claim 1, wherein said closed-end portion has a wall thickness that is larger than a wall thickness of said tube shaped body portion.

3. The retaining tube plug according to claim 1, wherein the wall thickness of said tube-shaped body portion is decreased during expansion to form said mechanical seal.

4. The retaining tube plug according to claim 1, wherein wall of said hole, resulting from removal of a failed boiler tube, is honed and cleaned to expose and prepare the wall surface of said hole prior to insertion of said retaining tube plug.

5. The retaining tube plug according to claim 1, wherein said retaining tube plug is machined from a single piece of metal.

6. The retaining tube plug according to claim 1, wherein diameter of outer circumference of said tube-shaped body portion is smaller than the diameter of said hole.

7. A method of plugging a hole, resulting from removal of a failed boiler tube, in a drum wall of a power boiler comprising:

inserting into said hole a retaining tube plug, which comprises:

a tube-shaped body portion, wherein the circumference of the cross sectional area of the tube-shaped body portion is uniform along the length of the body portion;

a closed-end portion at one end of said tube-shaped body portion, wherein said tube plug is closed at said closed-end portion, and wherein said closed-end portion is continuous with said tube-shaped body portion;

a lip portion at the other end of said tube-shaped body portion, wherein said lip portion is continuous with said tube-shaped body portion, wherein said lip portion has an opening, which is continuous with the interior of said tube-shaped body portion, and wherein said lip portion extends radially out from said tube-shaped body portion;

wherein said tube-shaped body portion, said closed-end portion and said lip portion are made from a single piece of metal;

wherein said retaining tube plug is inserted into the hole, resulting from removal of the failed boiler tube, in the drum wall of the power boiler, wherein said retaining tube plug is inserted closed-end portion first until said lip portion is in contact with the drum wall;

wherein the lip portion of the retaining tube plug is rigid and does not collapse when pressure is applied to the tube plug; and expanding said retaining tube plug walls within said hole to form a mechanical seal.

8. The method according to claim 7, wherein said closed-end portion has a wall thickness that is greater than a wall thickness of said tube shaped body portion.

9. The method according to claim 7, wherein the wall thickness of said tube-shaped body portion is decreased during expansion as the wall of said plug is compressed outwardly against the wall of said hole.

10. The method according to claim 7, wherein wall of said hole, resulting from removal of a failed boiler tube, is honed and cleaned to expose and prepare the wall surface of said hole prior to insertion of said retaining tube plug whereby a smooth mechanical fit may be obtained.

11. The method according to claim 7, wherein said retaining tube plug is machined from a single piece of metal.

12. The method according to claim 7, wherein diameter of outer circumference of said tube-shaped body portion is smaller than the diameter of said hole.

* * * * *